(12) United States Patent
Wobben

(10) Patent No.: US 6,939,103 B2
(45) Date of Patent: Sep. 6, 2005

(54) WIND POWER INSTALLATION WITH MULTIPLE BLADE ADJUSTING DEVICES

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/432,686

(22) PCT Filed: Sep. 8, 2001

(86) PCT No.: PCT/EP01/10388
§ 371 (c)(1),
(2), (4) Date: Sep. 19, 2003

(87) PCT Pub. No.: WO02/40862
PCT Pub. Date: May 23, 2002

(65) Prior Publication Data
US 2004/0052635 A1 Mar. 18, 2004

(30) Foreign Application Priority Data
Nov. 14, 2000 (DE) .......................................... 100 56 424
Mar. 30, 2001 (DE) .......................................... 101 16 011

(51) Int. Cl.$^7$ .................................................. F03B 3/14
(52) U.S. Cl. .............................. 415/155; 415/35; 415/61
(58) Field of Search ............................... 415/908, 118; 416/35, 42, 61, 155; 290/44, 55

(56) References Cited

U.S. PATENT DOCUMENTS

| | | | | | |
|---|---|---|---|---|---|
| 4,754,211 A | * | 6/1988 | Karjalainen | .................. | 318/762 |
| 5,281,094 A | * | 1/1994 | McCarty et al. | ............. | 416/147 |
| 5,584,655 A | | 12/1996 | Deering | ........................ | 416/31 |
| 5,595,474 A | * | 1/1997 | Girard | ............................ | 416/1 |

FOREIGN PATENT DOCUMENTS

| | | | |
|---|---|---|---|
| DE | 197 20 025 A1 | | 10/1997 |
| DE | 297 22 109 U1 | | 3/1998 |
| DE | 197 31 918 A1 | | 1/1999 |
| DE | 200 17 994 U1 | | 2/2001 |
| EP | 1 128 064 A2 | | 2/2001 |
| WO | WO9923384 | * | 5/1999 |

* cited by examiner

*Primary Examiner*—Ninh H. Nguyen
(74) *Attorney, Agent, or Firm*—Seed IP Law Group PLLC

(57) ABSTRACT

The present invention concerns a wind power installation having a rotor with at least one blade and an adjusting device for the rotor blade. An adjusting device with more than one drive for one rotor blade is provided. By virtue of that arrangement each drive only has to furnish a corresponding fraction of the power output, it can be of a correspondingly smaller design configuration, and it imposes a correspondingly lower loading on the subsequent components.

14 Claims, 2 Drawing Sheets

WIND POWER INSTALLATION WITH MULTIPLE BLADE ADJUSTING DEVICES

TECHNICAL FIELD

Figure 1:
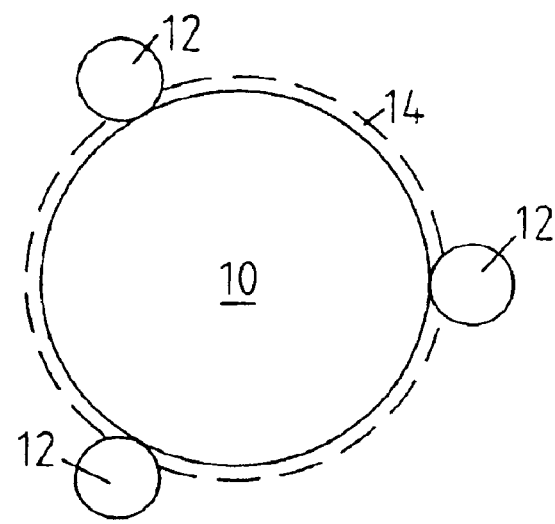

The present invention concerns a wind power installation having a rotor with at least one blade and an adjusting device for the rotor blade.

BACKGROUND OF THE INVENTION

Wind power installations with an adjusting device for the blade have long been known in the state of the art and are also described in the specialist literature. Thus for example in the work by Erich Hau in 'Windkraftanlagen', ['Wind power installations'], Springer-Verlag, 2nd edition, 1996, pages 231 ff.

That adjusting device must be designed in such a way that it can put the rotor blade or, in the case of central rotor blade adjustment, the rotor blades, into a predeterminable position in an acceptable time. For that purpose, a drive motor is frequently provided in the state of the art, and that motor must have a minimum power output which is predetermined by the rotor blades and the loads thereof.

Irrespective of considerations relating to the use and the design of transmission arrangements, it has been determined by the inventor that, with an increasing size of installation, the rotor blades also become larger and therefore the drive motor used for rotor blade adjustment must also furnish a higher power output. That higher power output inevitably results in the drive motor being of larger dimensions.

BRIEF SUMMARY OF THE INVENTION

In accordance with the invention, the adjusting device has at least two drives. In that way the necessary force for adjustment of the rotor blade or rotor blades can be applied simultaneously at a plurality of locations to the blade root. Therefore, according to the number of drives, each drive acts on the subsequent components only with a corresponding fraction of the overall force required. That in turn permits those components to be of a smaller design configuration.

In addition, it is possible in accordance with the invention to use available drives which are already now available in large numbers and which are already tried-and-tested in continuous operation. In addition, apparatuses and methods for the handling thereof are already known and tried-and-tested.

In a particularly preferred embodiment of the invention the drives are electric motors, more specifically preferably dc motors. In the case of a fault those electric motors can be connected to an existing emergency power supply, for example in the form of a battery.

It is also possible to use three-phase asynchronous motors as the electric motors. To produce a braking torque, those motors, after the three-phase current flowing during the rotor blade adjustment procedure is switched off, are supplied with a direct current so that a stationary magnetic field is produced in the asynchronous motors. In that way the motors which are still rotating can be braked and a braking torque is maintained in the stationary motors.

In regard to the further operating procedure involved in pitch regulation, attention is also to be directed to German patent application No 197 31 918.1, which is incorporated herein by reference in its entirety. Insofar as the configurations in the present invention are concerned, the man skilled in the art would also be able to make use of the structure described therein within the present invention.

Further advantageous embodiments of the invention are set forth in the appendant claims.

BRIEF DESCRIPTION OF THE SEVERAL VIEWS OF THE DRAWING(S)

Figure 2:
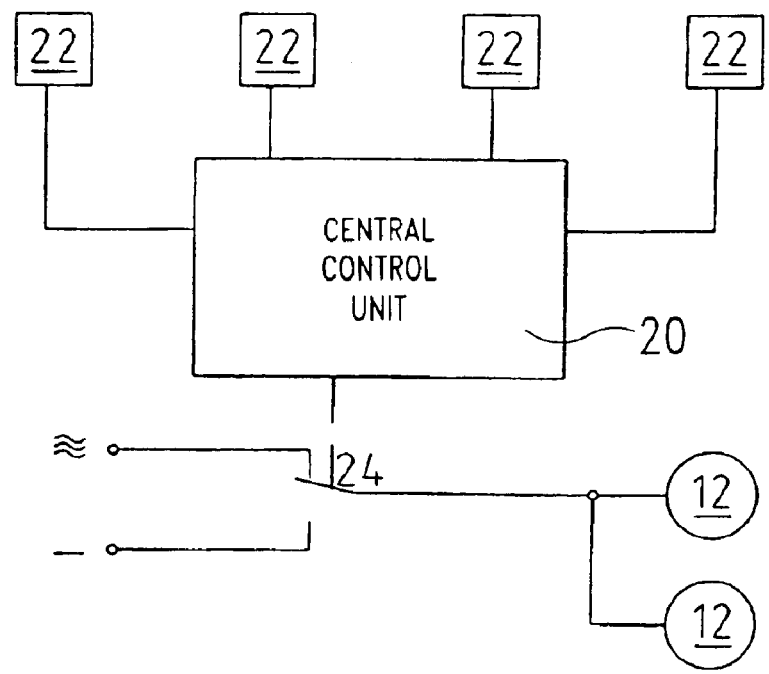
Figure 3:
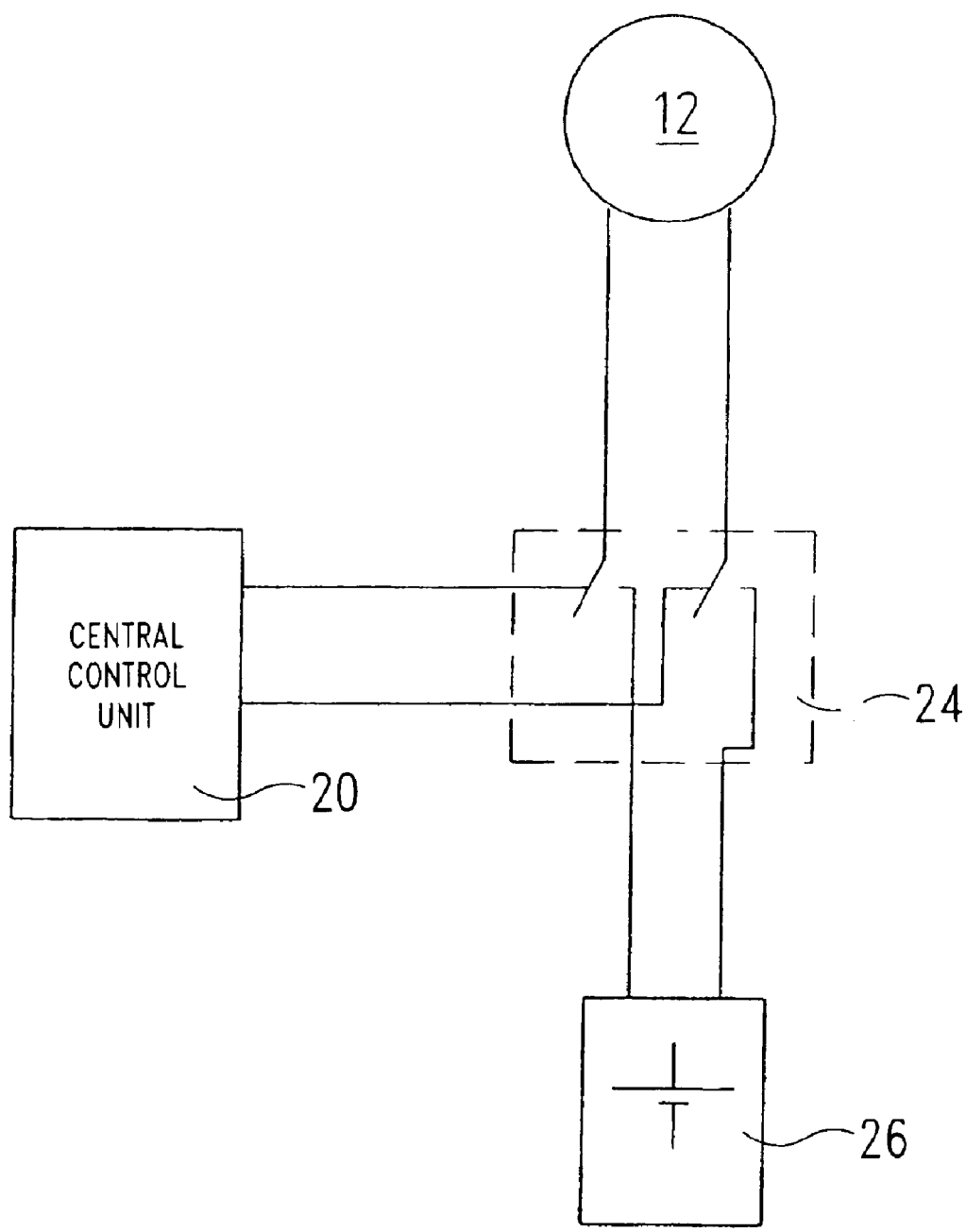

An embodiment of the invention is described hereinafter with reference to the accompanying drawings in which:

FIG. 1 is a simplified representation of a rotor blade root with a plurality of drives, FIG. 2 is a simplified representation of a control according to the invention, and FIG. 3 is a simplified representation of a control according to the invention by means of a dc motor.

DETAILED DESCRIPTION OF THE INVENTION

FIG. 1 shows in greatly simplified form a rotor blade root 10, at the periphery of which are arranged three adjusting drives 12. The rotor blade root 10 itself has an external tooth arrangement 14 at its outer periphery, which is indicated by a broken line.

The adjusting drives 12 are arranged at uniform spacings at the periphery of the rotor blade root. The adjusting drives preferably engage by way of a tooth arrangement a rotary ball connection which is installed in the form of a rotary mounting for the rotor blade and by way thereof adjust the rotor blade. Admittedly, it would theoretically be basically possible for the adjusting drives also to directly engage the rotor blade, but under some circumstances that is undesirable as the rotor blade root—like also the rest of the rotor blade—comprises glass fibre-reinforced plastic material (GRP) or the like and the fact of the adjusting drives directly engaging in the rotor blade could result in damage to the rotor blade. By virtue of simultaneous operation of all three drives 12, each drive 12 only has to apply a third of the overall power output required, which is necessary for adjustment of the rotor blade 10.

In addition, due to the fact that each of the adjusting drives only has to apply a part, in the specific example illustrated, only a third, of the overall force required, the dimensioning thereof can also be smaller than when only a single adjusting drive 12 is used.

In the event of damage to one of the adjusting drives 12, it can still be handled manually, if of suitable dimensions, and can be replaced for example using a block and tackle, within the pylon of the wind power installation. Alternatively, the drives can be sized such that if one of the three fails, the remaining drive 12 or drives 12 have sufficient power to move the rotor until the failed drive 12 can be repaired.

FIG. 2 shows a control arrangement. The control arrangement has a central control unit 20 and a plurality of components 22 which can be in the form of measurement value pick-ups and/or reference value generators and/or input means. By way of those components, items of information are made available to the control unit 20, and from those items of information the control unit 20 derives control data required for actuation of the adjusting drives 12.

Those control data can influence for example a switching device 24 which supplies the adjusting drives 12 which are in the form of three-phase asynchronous motors either with a three-phase current for adjustment of the rotor blades 10 or with a direct current for producing a braking torque in the adjusting drives 12.

In that way the adjusting drives can exert a braking action in the event of spontaneous changes in load at the rotor blades, for example with gusty winds which abruptly and briefly change in direction, so that meaningful rotor blade adjustment is not possible.

The three adjusting drives 12 are so designed that the further adjusting function of the rotor blades can be maintained even if one of the three adjusting drives fails. The entire wind power installation therefore does not have to be shut down if—for whatever reasons—an adjusting drive should fail, because then the respectively necessary pitch regulation effect can still be maintained by the two adjusting drives which remain.

If one of the adjusting drives fails, the loads which are then applied to the two remaining adjusting drives are admittedly greater than previously, but it will be noted that each adjusting drive is so designed that it can be operated in an overload mode even for a prolonged period of time. In that respect therefore each individual adjusting drive is somewhat over-sized so that, in the situation where one of the adjusting drives fails, a drive can still be operated in an overload mode for a certain period of time in order to initiate a safe stop for the wind power installation or to bring the rotor blades into the feathered position.

FIG. 3 shows by way of example one of the drives 12 which is connected by way of a relay 24 to the normal operating voltage. In this case the relay 24 is in the working position.

If now a power failure occurs the relay 24 is also de-energised and the contacts of the relay will switch over and in their rest position connect the adjusting drive 12 to the battery 26 so that, in such a situation, movement of the rotor blade into the feathered position and thus stoppage of the installation is reliably and safely possible. Deep discharge of the battery is tolerated in that case because it is to be preferred to the installation being in an indeterminate condition, with an unclear rotor blade pitch setting, even though deep discharge of the battery is not preferred.

I claim:

1. A wind power installation comprising:
    a rotor;
    a rotor blade coupled to the rotor; and
    an adjusting device for adjusting the pitch angle for the rotor blade, the adjusting device having at least two electric-motor drives for applying a force for adjustment of the rotor blade at the root of the rotor blade at different locations for each drive.

2. A wind power installation according to claim 1 wherein in that the electric drives are electric dc motors.

3. A wind power installation according to claim 1 wherein in that the electric drives are three-phase asynchronous motors and that the three-phase asynchronous motors are at times supplied with direct current.

4. A wind power installation according to claim 1 wherein by:
    measuring means for ascertaining the instantaneous loading of at least a part of the wind power installation; and
    control means which ascertain the position of the rotor blade that is desired for greater loading than the current loading, correspondingly adjust same by means of the adjusting device.

5. The wind power installation according to claim 4, further including means for adjusting the pitch of the rotor blade to achieve greater loading.

6. The wind power installation according to claim 5, wherein said loading level is a maximum possible loading level.

7. A wind power installation according to claim 1, further including:
    a second rotor blade and wherein in that at least one rotor blade is adjustable asynchronously with respect to the other or others.

8. A wind power installation according to claim 1 wherein in that a position of the rotor blade, that is desired for a given instantaneous loading, can be predetermined by way of input means connected to a control means.

9. A wind power installation according to claim 1 wherein in that the adjusting device for adjustment of the rotor blade has an adjusting motor and an adjusting transmission driven thereby, wherein a control means receive an actual value relating to an instantaneous position of the rotor blade, by way of the adjusting device.

10. The wind power installation according to claim 9 further including means for adjusting.

11. A wind power installation according to claim 1 wherein in that a control means effect adjustment of the rotor blade without delay with acquisition of measurement values.

12. A wind power installation comprising:
    a rotor;
    a rotor blade coupled to the rotor; and
    an adjusting device for adjusting the pitch angle for the rotor blade, the adjusting device having at least two electric-motor drives for applying a force for adjustment of the rotor blade at the root of the rotor blade at different locations for each drive, wherein at least one portion of the rotor blade is adjustable asynchronously with respect to at least one further adjustable portion of the same rotor blade or with respect to the other rotor blade or blades or the portion thereof.

13. A wind power installation comprising:
    a rotor;
    a rotor blade coupled to the rotor; and
    an adjusting device for adjusting the pitch angle for the rotor blade, the adjusting device having at least two electric-motor drives for applying a force for adjustment of the rotor blade at the root of the rotor blade at different locations for each drive, wherein the drives of the adjusting device are coupled to each other.

14. A wind power installation according to claim 13 wherein in that the drives are electrically coupled to each other by a transformer.

* * * * *